United States Patent
Garosshen

(10) Patent No.: US 10,422,593 B2
(45) Date of Patent: Sep. 24, 2019

(54) SACRIFICIAL ALUMINUM FINS FOR FAILURE MODE PROTECTION OF AN ALUMINUM HEAT EXCHANGER

(71) Applicant: Carrier Corporation, Farmington, CT (US)

(72) Inventor: Thomas J. Garosshen, Glastonbury, CT (US)

(73) Assignee: CARRIER CORPORATION, Farmington, CT (US)

(*) Notice: Subject to any disclaimer, the term of this patent is extended or adjusted under 35 U.S.C. 154(b) by 60 days.

(21) Appl. No.: 14/394,058

(22) PCT Filed: Apr. 11, 2013

(86) PCT No.: PCT/US2013/036254
§ 371 (c)(1),
(2) Date: Oct. 10, 2014

(87) PCT Pub. No.: WO2013/155355
PCT Pub. Date: Oct. 17, 2013

(65) Prior Publication Data
US 2015/0068714 A1   Mar. 12, 2015

Related U.S. Application Data

(60) Provisional application No. 61/623,375, filed on Apr. 12, 2012.

(51) Int. Cl.
*F28F 19/02* (2006.01)
*F28F 19/06* (2006.01)
(Continued)

(52) U.S. Cl.
CPC .............. *F28F 19/06* (2013.01); *B23P 15/26* (2013.01); *F28F 1/12* (2013.01); *F28F 1/30* (2013.01);
(Continued)

(58) Field of Classification Search
CPC .. F28F 19/06; F28F 1/12; F28F 21/084; F28F 1/30; F28F 1/32; B23P 15/26; Y10T 29/4935
(Continued)

(56) References Cited

U.S. PATENT DOCUMENTS 4,892,141 A * 1/1990 Shiga ...................... C23C 26/00
                                                                    165/133
7,798,205 B2 * 9/2010 Minami ............... B23K 1/0012
                                                                    165/133
(Continued)

FOREIGN PATENT DOCUMENTS

JP         H06331292 A     11/1994
JP        2004156561 A  *  6/2004
(Continued)

OTHER PUBLICATIONS

JP 2004-156561 A Translation.*
(Continued)

*Primary Examiner* — Claire E Rojohn, III
(74) *Attorney, Agent, or Firm* — Cantor Colburn LLP

(57) ABSTRACT

A method of localized cathodic protection of a heat exchanger, includes providing at least one fin formed from a first metal alloy; applying a sacrificial layer of a second metal to at least one region in the at least one fin; and connecting a refrigerant tube to the at least one fin; wherein the sacrificial layer of the second metal includes a metal from one of a zinc alloy or a magnesium alloy.

20 Claims, 2 Drawing Sheets

(51) Int. Cl.
*F28F 21/08* (2006.01)
*F28F 1/30* (2006.01)
*F28F 1/32* (2006.01)
*B23P 15/26* (2006.01)
*F28F 1/12* (2006.01)

(52) U.S. Cl.
CPC .............. *F28F 1/32* (2013.01); *F28F 21/084* (2013.01); *Y10T 29/4935* (2015.01)

(58) Field of Classification Search
USPC ...................... 165/134.1, 133, 80.4, 150, 151
See application file for complete search history.

(56) References Cited

U.S. PATENT DOCUMENTS

| | | | | |
|---|---|---|---|---|
| 7,921,559 B2* | 4/2011 | Zobel | .................... | B21C 37/151 |
| | | | | 29/890.032 |
| 8,079,508 B2* | 12/2011 | Foust | ........................ | F03G 7/05 |
| | | | | 228/183 |
| 8,091,621 B2* | 1/2012 | Zobel | .................... | B21C 37/151 |
| | | | | 165/177 |
| 8,191,258 B2* | 6/2012 | Zobel | .................... | B21C 37/14 |
| | | | | 29/890.053 |
| 8,281,489 B2* | 10/2012 | Zobel | .................... | B21C 37/151 |
| | | | | 29/890.053 |
| 8,434,227 B2* | 5/2013 | Eisele | .................... | B21C 37/08 |
| | | | | 29/890.049 |
| 8,438,728 B2* | 5/2013 | Zobel | .................... | B21C 37/151 |
| | | | | 165/177 |
| 8,561,451 B2* | 10/2013 | Opferkuch | ............ | B21C 37/151 |
| | | | | 29/890.053 |
| 8,683,690 B2* | 4/2014 | Zobel | .................... | B21C 37/151 |
| | | | | 165/177 |
| 8,708,034 B2* | 4/2014 | Saito | ........................ | F24F 1/30 |
| | | | | 165/133 |
| 8,726,508 B2* | 5/2014 | Zobel | .................... | B21C 37/151 |
| | | | | 165/177 |
| 9,038,267 B2* | 5/2015 | Schmid | ................ | B21C 37/225 |
| | | | | 225/103 |
| 9,383,143 B2* | 7/2016 | Fryer | .................... | F28D 1/0308 |
| 9,433,996 B2* | 9/2016 | Wintersteen | ............. | F28F 19/06 |
| 2009/0260794 A1* | 10/2009 | Minami | ............... | B23K 1/0012 |
| | | | | 165/182 |
| 2010/0212876 A1* | 8/2010 | Hancock | .................. | F28F 1/32 |
| | | | | 165/182 |
| 2010/0266871 A1* | 10/2010 | Matsuo | ................. | B32B 15/016 |
| | | | | 428/654 |
| 2011/0014494 A1* | 1/2011 | Matsumoto | .......... | B23K 1/0012 |
| | | | | 428/654 |
| 2011/0027610 A1* | 2/2011 | Tatsumi | ............. | B23K 35/0272 |
| | | | | 428/654 |
| 2011/0192583 A1* | 8/2011 | Sakashita | ............. | B23K 1/0012 |
| | | | | 165/177 |
| 2015/0068714 A1* | 3/2015 | Garosshen | .............. | F28F 19/06 |
| | | | | 165/134.1 |

FOREIGN PATENT DOCUMENTS

| | | | | |
|---|---|---|---|---|
| JP | 2009250510 A | * | 10/2009 | ................ F28F 1/32 |
| JP | 2011080121 A | | 4/2011 | |
| WO | 9817841 A1 | | 4/1998 | |
| WO | 0050664 A1 | | 8/2000 | |
| WO | 2004040038 A1 | | 5/2004 | |
| WO | 2012014934 A1 | | 2/2012 | |
| WO | 2012018536 A2 | | 2/2012 | |

OTHER PUBLICATIONS

International Preliminary Report on Patentability and Written Opinion regarding related PCT Application No. PCT/US2013/036254; dated Oct. 14, 2014; 5 pgs.

Search Report and translation of Office Action regarding related CN App. No. 201380019440.5; dated Feb. 3, 2016; 13 pgs.

* cited by examiner

SACRIFICIAL ALUMINUM FINS FOR FAILURE MODE PROTECTION OF AN ALUMINUM HEAT EXCHANGER

CROSS REFERENCE TO RELATED APPLICATIONS

This application is a National Phase Application of Patent Application PCT/US2013/036254 filed on Apr. 11, 2013, which claims priority to U.S. 61/623,375 filed Apr. 12, 2012, the disclosure of which is incorporated herein by reference in its entirety.

FIELD OF INVENTION

The subject matter disclosed herein relates generally to the field of cathodic protection of aluminum alloy heat exchangers, and more particularly, to protecting an all-aluminum alloy heat exchanger by providing a more sacrificial layer of an element or an alloy on an aluminum fin that is connected to an aluminum refrigerant tube for the reducing the corrosion rates of the tube and a catastrophic failure of the heat exchanger.

DESCRIPTION OF RELATED ART

Aluminum alloys are mixtures of aluminum with other metals (called an alloy), often, zinc, manganese, silicon, copper, rare earths and zirconium. Aluminum alloys are lightweight, have a high specific strength and high-heat conductivity. Due to these excellent mechanical properties, aluminum alloys are used as heat exchangers for heating or cooling systems in commercial, industrial, and marine applications. Typical heat exchangers that use an aluminum alloy material are fin, refrigerant tube, and plate heat exchangers.

However, aluminum alloy heat exchangers have a relatively high susceptibility to corrosion. In marine applications, particularly, sea water or wind-blown seawater mist creates an aggressive chloride environment in these heat exchangers. This chloride environment rapidly causes localized and general corrosion of braze joints, fins, and refrigerant tubes. The corrosion modes include galvanic, crevice, and pitting corrosion. The corrosion eventually leads to a loss of refrigerant from the tubes and failure of the heating or cooling system. Sudden tube failure results in a rapid loss of cooling and spoilage of cargo. An improvement in providing cathodic protection to an aluminum alloy heat exchanger in order to reduce its corrosion rates and prevent catastrophic failure of the tube would be well received in the art.

BRIEF SUMMARY

According to one aspect of the invention, a method of localized cathodic protection of a heat exchanger, includes providing at least one fin formed from a first metal alloy; applying a sacrificial layer of a second metal to at least one region in the at least one fin; and connecting a refrigerant tube to the at least one fin; wherein the sacrificial layer of the second metal includes a metal from one of a zinc alloy or a magnesium alloy.

According to another aspect of the invention, a heat exchanger exhibiting resistance to galvanic corrosion, includes at least one fin formed from a first metal alloy; a sacrificial layer of a second metal applied locally to at least one region in the at least one fin; and a refrigerant tube connected to the at least one fin; wherein the sacrificial layer of the second metal includes a metal from one of a zinc or magnesium alloy Other aspects, features, and techniques of the invention will become more apparent from the following description taken in conjunction with the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawing in which:

DETAILED DESCRIPTION

The present invention is more particularly described in the following description and examples are intended to be illustrative only since numerous modification and variations therein will be apparent to those skilled in the art. As used in the specification and in the claims, the singular form "a", "an," and "the" may include plural referents unless the context clearly dictates otherwise. Also, all ranges disclosed herein are inclusive of the endpoints and are independently combinable.

Embodiments of a process for protecting an aluminum alloy heat exchanger from system and catastrophic failure in a corrosive environment by corroding the aluminum tube. The corrosion may result in a slow coolant refrigerant leak causing a system failure or a catastrophic failure. The process for protecting the heat exchanger from corrosion failures includes providing a more sacrificial metal layer to be applied locally to aluminum alloy fins of a round-tube-plate-fin (RTPF) all aluminum alloy heat exchanger. In some embodiments, an anodic element or alloy of zinc (Zn), magnesium (Mg), or beryllium (Be) may, in some non-limiting embodiments, be applied by a clad metal process, surface treatment including thermal arc spray, plasma deposition or spray, electroplating, rolling or roll and spray coating, or alloying the aluminum locally with higher amounts of anodic elements like Zn, Mg or Be. The locally sacrificial aluminum alloy fins provide cathodic protection to the tube surface by providing electrons to support the oxidation reaction on the tube surface thereby oxidizing the anodic (Zn, Be, or Mg) enriched layers in the aluminum alloy fins. When both the aluminum alloy metals (i.e., fins and refrigerant tube) are in electrical contact with each other in the presence of an electrolyte, the fins become sacrificial over time with respect to the refrigerant tube. The oxidation of the fins prevents corrosion of the refrigerant tube, thereby preventing the rupturing of the refrigerant tube and avoiding a catastrophic failure of the heating or cooling system.

Figure 1:
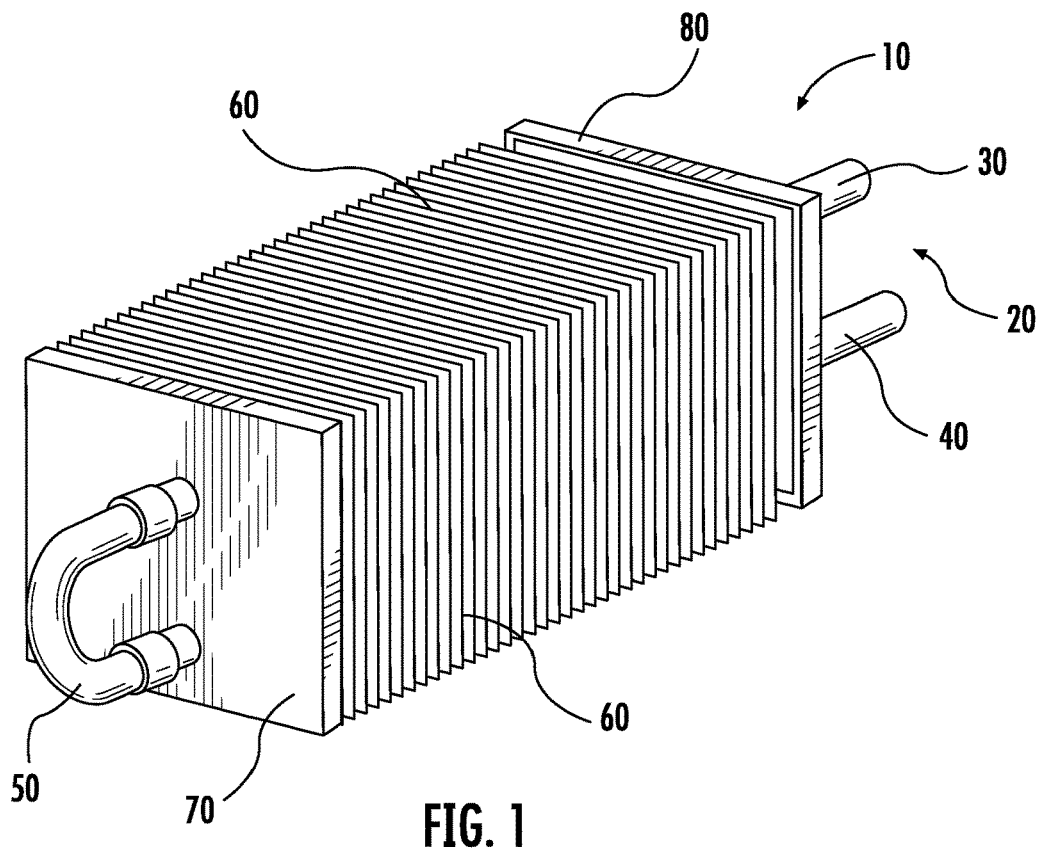
FIG. 1 depicts a perspective view of a heat exchanger incorporating heat exchanger fins treated according to an embodiment of the invention.

Referring now to the drawings, FIG. 1 depicts an exemplary RTPF heat exchanger 10 having heat exchanger fins 60 that are treated for galvanic corrosion protection according to an embodiment of the invention. Particularly, the heat exchanger 10 includes one or more flow circuits for carrying refrigerant through the heat exchanger 10. For the purposes of explanation, the heat exchanger 10 is shown with a single flow circuit refrigerant tube 20 consisting of an inlet line 30 and an outlet line 40. The inlet line 30 is connected to the outlet line 40 at one end of the heat exchanger 10 through a 90 degree tube bend 50. It should be evident, however, that more circuits may be added to the unit depending upon the demands of the system. The refrigerant tube 20 is generally made of an aluminum alloy based core material and, in some embodiments, may be made from aluminum alloys selected from 1000 series, 5000 series, or 6000 series aluminum alloys. The heat exchanger 10 further includes a series of fins 60 comprising radially disposed plate like elements spaced along the length of the flow circuit. The fins 60 are provided between a pair of end plates 70 and 80 and are supported by the lines 30, 40 in order to define a gas flow passage through which conditioned air passes over the refrigerant tube 20 and between the spaced fins 60. Also, in some embodiments, the fins 60 are generally made of an aluminum alloy substrate material such as, for example, materials selected from the 1000 series, 7000 series, or 8000 series aluminum alloys.

In one embodiment, a highly anodic element or alloy is deposited or clad onto the aluminum fin alloy substrate. In an embodiment, a layer of Zn, Mg, or Be may be disposed locally on the substrate prior to its formation into fins 60 according to the processes shown and described herein. As will be appreciated by those of skill in the art, the Zn, Mg, or Be rich layers are less noble and more anodic than the aluminum alloy refrigerant tube 20, which becomes cathodic. The local anodic Zn, Mg, or Be rich layer transfers more of the oxidation reaction away from the tube surface to the local Zn, Mg or Be rich layers on the fins 60. As a result, when both the aluminum alloy metals (i.e., fins 60 and refrigerant tube 20) are in electrical contact with each other, the fins 60 become locally sacrificial over time with respect to the refrigerant tube 20 and oxidize earlier. The oxidation of the fins 60 and braze joints provides cathodic protection of the refrigerant tube 20 where the more anodic Zn, Mg, or Be layers in the fins 60 supplies oxidation electrons to the refrigerant tube 20 in the presence of an electrolyte, thereby preventing the rupturing of the refrigerant tube 20 and avoiding system failure or a catastrophic failure of the heating or cooling system.

Figure 2:
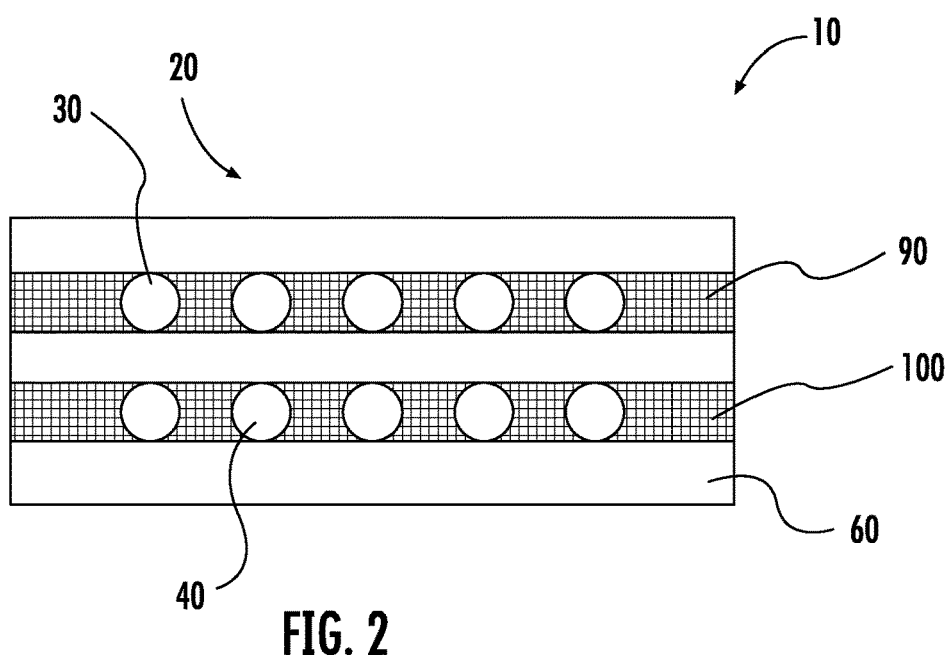
FIG. 2 depicts a sectional view of the tube and fins incorporating the treated heat exchanger fins according to an embodiment of the invention.
Figure 3:
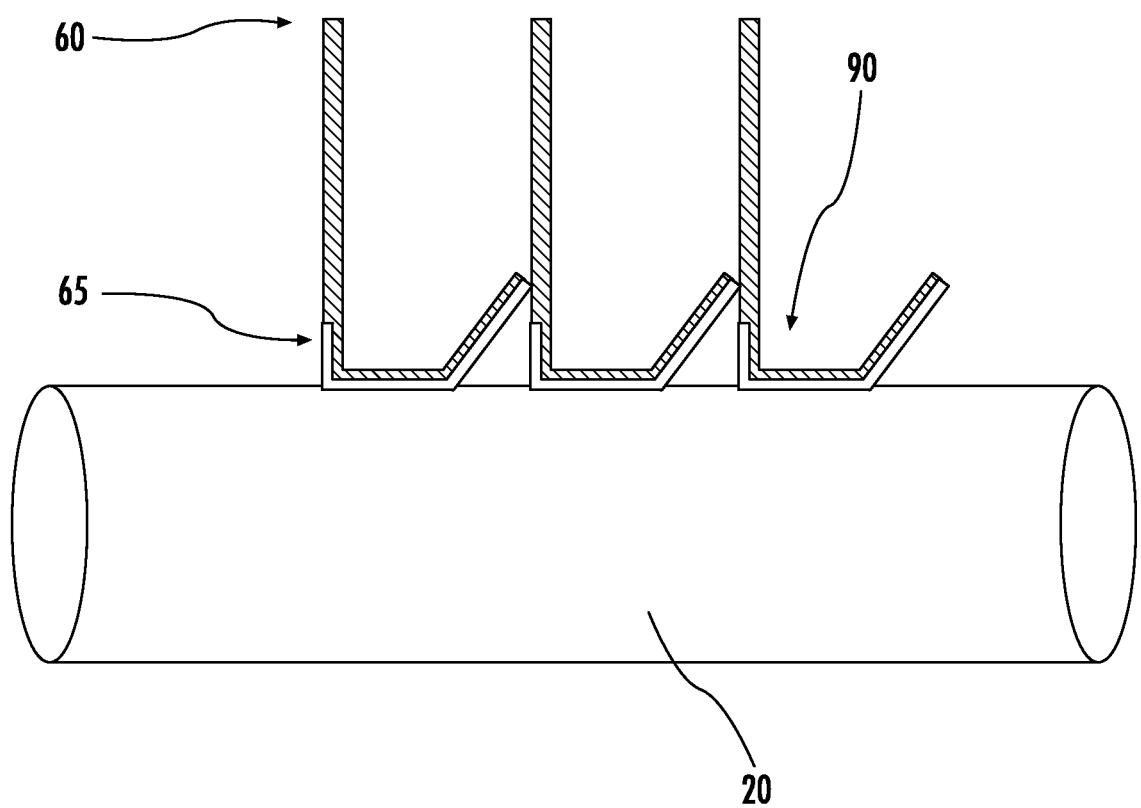
FIG. 3 depicts a partial sectional view of the tube and fins showing localized application of an anodic element according to an embodiment of the invention.

FIGS. 2-3 depict a sectional view of the heat exchanger 10 including the refrigerant tube 20 and fins 60 according to an embodiment of the invention. In a typical arrangement, shown in FIG. 2, an aluminum alloy refrigerant tube 20 with the circuit flow inlet lines 30, 40 are fabricated with the generally coplanar aluminum alloy plates for the heat exchanger fins 60. The attachment point of the fins 60 and lines 30, 40 are brazed to form a permanent connection. Referring back to FIGS. 2-3, the fins 60, in an exemplary embodiment, include one or more surface layers 65 of Zn (FIG. 3) that is locally applied to the generally coplanar aluminum alloy substrate (or substrate) along a fin collar forming regions 90, 100 prior to stamping into the fins 60 and assembly into the heat exchanger 10. In another embodiment, a Mg, Be, or an enrichment layer of Zn, Mg, or Be in various combinations may also be used in lieu of the Zn layer 65 at regions 90, 100 without departing from the scope of the invention. By applying the anodic layer at the fin collar regions 90 and 100, cathodic protection of the tube can be maximized while also providing good ductility of the fin 60 for manufacturing. The fin collar forming regions 90, 100 are a localized region where the circuit flow lines 30, 40 contact a fin collar (i.e., an interface of the refrigerant tube 20 and fins 60 where the galvanic couple is made). As such, galvanic corrosion occurs at the fin collar forming regions 90, 100. In operation, the fins 60 draw heat away from the tubes through conductive heat transfer and then dissipate the heat through convective heat transfer to the gas (commonly air) flowing over the tubes. Aluminum alloy is utilized for constructing the refrigerant tube 20 because of its good heat transfer properties, general resistance to corrosion, and ease of repair. The fins 60 are fabricated from aluminum alloy because of its good heat transfer properties, ease of fabrication, and low cost.

In an embodiment, the exposed surfaces of the fins 60 are coated or enriched with a Zn layer 65 along the fin collar forming regions such as, for example, regions 90, 100. In an exemplary process, the process of coating or surface enrichment of the fins 60 with Zn is accomplished prior to the assembly of the heat exchanger 10. As previously mentioned, a Mg, Be, or an enrichment layer of Zn, Mg, or Be in various combinations may also be used in lieu of the Zn layer 65 without departing from the scope of the invention. The exemplary process is initiated by surface pre-treatment of an aluminum alloy substrate of the fins 60 during which the substrate undergoes various treatments to yield a surface character suitable for a subsequent Zn coating or cladding process. The surface pre-treatment is not only used to remove dirt and organic contaminants from the surface of the aluminum alloy substrate, but also to remove an oxide or a hydroxide formed on the aluminum alloy substrate. According to one exemplary process, the substrate preparation includes removing surface contaminants using a suitable technique such as, in some non-limiting examples, solvent rinsing, vapor degreasing using trichloroethylene or other suitable solvents, solvent emulsion cleaning or the like in order to remove any grease, or organic compounds. In an exemplary embodiment, a degreasing bath having an aqueous alkaline solution containing a surfactant may be utilized to clean the substrate. The composition of the degreasing bath is not critical as long as the bath can remove organic contaminants. In another embodiment, a mechanical pre-treatment such as, for example, abrasive wheels, wire brushes, grit blasting, or plasma cleaning may be used to remove the oxide or hydroxide layer. As will be appreciated by those of skill in the art, these surface pre-treatment procedures are susceptible to a wide array of alternatives. Thus, it is contemplated that any number of other procedures and practices may likewise be utilized such as, for example, by mechanical methods or by immersion or spray cleaner systems in order to perform the pre-treatment process of the substrate.

In an embodiment, following surface pre-treatment, the pre-treated substrate is dried and subjected to a cladding process with a Zn based alloy in order to provide a highly anodic Zn layer to the substrate. The cladding process includes mechanically bonding together the Zn based alloy with the aluminum alloy substrate by pressing or rolling together a thin sheet of Zn based alloy with the aluminum alloy substrate under high pressure. In another embodiment, the Zn based alloy and the aluminum alloy substrate may be extruded through a die to form the clad material.

In another embodiment, a surface layer of Zn may be locally applied to the substrate by a surface treatment process such as, for example, thermal arc spraying in order to diffuse Zn into the aluminum alloy substrate. Thermal arc spraying is where melted (or heated) Zn materials are sprayed onto the substrate to coat the surface with a uniform layer of Zn having an average thickness of about 1 micron to about 10 microns. In other non-limiting embodiment, the Zn material may be applied by plasma deposition where a vaporized or liquidized form of the Zn material is deposited onto the aluminum alloy substrate, electroplating where a solution of Zn metal ions are moved by an electric field to coat the aluminum alloy substrate using electrical current, roll/spray coatings where semi-solid sprayed droplets of Zn material are deposited onto the aluminum alloy substrate with gas jets, or the like. In yet another embodiment, the Zn or other metal layer may be sprayed or roll-coated onto the fin as a metal powder slurry or metal powder with binder, and then thermally diffusing the metal into the surface of the aluminum fin. In yet another exemplary embodiment, the layer is applied locally only over the area of the fin that is in contact with the tube. The Zn layer may be optimized through a series of trials.

In another embodiment, in the arrangement shown in FIG. 2, the interface of the refrigerant tube 20 and fins 60 is where the galvanic couple is made and where the corrosion of the aluminum alloy fins 60 occurs. Once the fins 60 have corroded at the intersection, the fins 60 are no longer in contact with the refrigerant tube 20 and thus the efficiency of the heat exchanger 10 is greatly reduced because the fins 60 loses its ability to conduct heat away from the refrigerant tube 20. The oxidation of the fins 60 and braze joints prevents corrosion of the refrigerant tube 20 thereby preventing the rupturing of the refrigerant tube 20 and avoiding a catastrophic failure of the heating or cooling system.

The technical effects and benefits of exemplary embodiments include a process for protecting an aluminum alloy heat exchanger from catastrophic corrosion failure. The process provides a more sacrificial aluminum alloy such as Zn, Mg, or Be to be applied to the fins of the heat exchanger. In some embodiments, the Zn, Mg, or Be layer may be applied by a clad metal process, surface treatment including thermal arc spray, plasma vapor deposition or spray, electroplating, rolling or spray coating, or alloying aluminum with higher amounts of anodic elements like Zn, Mg, or Be. The sacrificial aluminum alloy fins provide cathodic protection to the tube by oxidizing the Zn, Mg, or Be layers in the aluminum alloy fins. When both the aluminum alloy metals (i.e., fins and refrigerant tube) are in electrical contact with each other in the presence of an electrolyte, the fins become sacrificial over time with respect to the refrigerant tube. The oxidation of the fins and braze joints prevents corrosion of the refrigerant tube, thereby preventing the rupturing of the refrigerant tube and avoiding a catastrophic failure of the heating or cooling system.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A heat exchanger exhibiting resistance to galvanic corrosion, comprising:
   a refrigerant tube; and
   at least one fin formed from a first metal alloy, connected to the refrigerant tube along a fin surface portion in contact with the refrigerant tube;
   said at least one fin including a sacrificial layer of a second metal disposed locally on at least one region in the at least one fin including on the fin surface portion in contact with the refrigerant tube and on a fin surface portion adjoining the fin surface portion in contact with the refrigerant tube;
   wherein the sacrificial layer of the second metal includes a metal from one of a zinc or magnesium alloy.

2. The heat exchanger of claim 1, wherein the refrigerant tube is connected at a contact area within the at least one region.

3. The heat exchanger of claim 1, wherein the refrigerant tube is connected to a fin collar within the at least one region.

4. The heat exchanger of claim 1, wherein the refrigerant tube is at least formed from the first metal alloy of aluminum.

5. The heat exchanger of claim 1, wherein the first metal alloy is more noble than the second metal such that direct contact between the at least one fin and the refrigerant tube in the presence of an electrolyte would lead to galvanic corrosion of the sacrificial layer.

6. The heat exchanger of claim 1, wherein the sacrificial layer comprises one of a Zinc (Zn), Magnesium (Mg), or Beryllium (Be) based alloy clad to the at least one fin.

7. The heat exchanger of claim 1, wherein the sacrificial layer comprises a melted layer of the second metal sprayed onto the at least one fin or a vaporized form of the second metal deposited to the at least one fin.

8. The heat exchanger of claim 1, wherein the sacrificial layer on the fin surface portion adjoining the fin surface portion in contact with the refrigerant tube extends away from the refrigerant tube.

9. The heat exchanger of claim 1, wherein the sacrificial layer comprises an aluminum metal alloy formed with a 1 percent constituent of the second metal by weight.

10. A method of localized cathodic protection of the heat exchanger of claim 1, comprising:
    providing at least one fin formed from a first metal alloy;
    applying a sacrificial layer of a second metal locally to at least one region in the at least one fin; and
    connecting a refrigerant tube to a fin surface having the sacrificial layer thereon within the at least one region of the at least one fin bearing the sacrificial layer;
    wherein the sacrificial layer of the second metal includes a metal from one of a zinc alloy or a magnesium alloy, and the tube is cathodic with respect to the fin.

11. The method of claim 10, wherein the connecting of the refrigerant tube further comprises connecting the refrigerant tube at a contact area within the at least one region.

12. The method of claim 10, wherein the connecting of the refrigerant tube further comprises connecting the refrigerant tube to a fin collar within the at least one region.

13. The method of claim 10, wherein the refrigerant tube is at least formed from the first metal alloy comprising aluminum.

14. The method of claim 10, wherein the first metal alloy is more noble than the second metal such that direct contact between the at least one fin and the refrigerant tube in the presence of an electrolyte would lead to galvanic corrosion of the sacrificial layer.

15. The method of claim 10, wherein the applying of the sacrificial layer further comprises cladding one of a Zinc (Zn), Magnesium (Mg), or Beryllium (Be) based alloy to the at least one fin.

16. The method of claim 10, wherein the applying of the sacrificial layer further comprises spraying a melted layer of the second metal to the at least one fin.

17. The method of claim 10, wherein the applying of the sacrificial layer further comprises depositing a vaporized form of the second metal to the at least one fin.

18. The method of claim 1, wherein the sacrificial layer applied on the fin surface portion adjoining the fin surface portion in contact with the refrigerant tube extends away from the refrigerant tube.

19. The method of claim 10, wherein the applying of the sacrificial layer further comprises applying a coating composition comprising powder of the second metal to the at least one fin.

20. The method of claim 10, wherein the applying of the sacrificial layer further comprises forming an aluminum metal alloy comprising a 0.5 to 2.5 percent constituent of the second metal by weight.

* * * * *